March 30, 1965  J. V. ATANASOFF  3,175,395
APPARATUS FOR SENSING AND MEASURING FLUID TURBULENCE
Filed Nov. 15, 1960
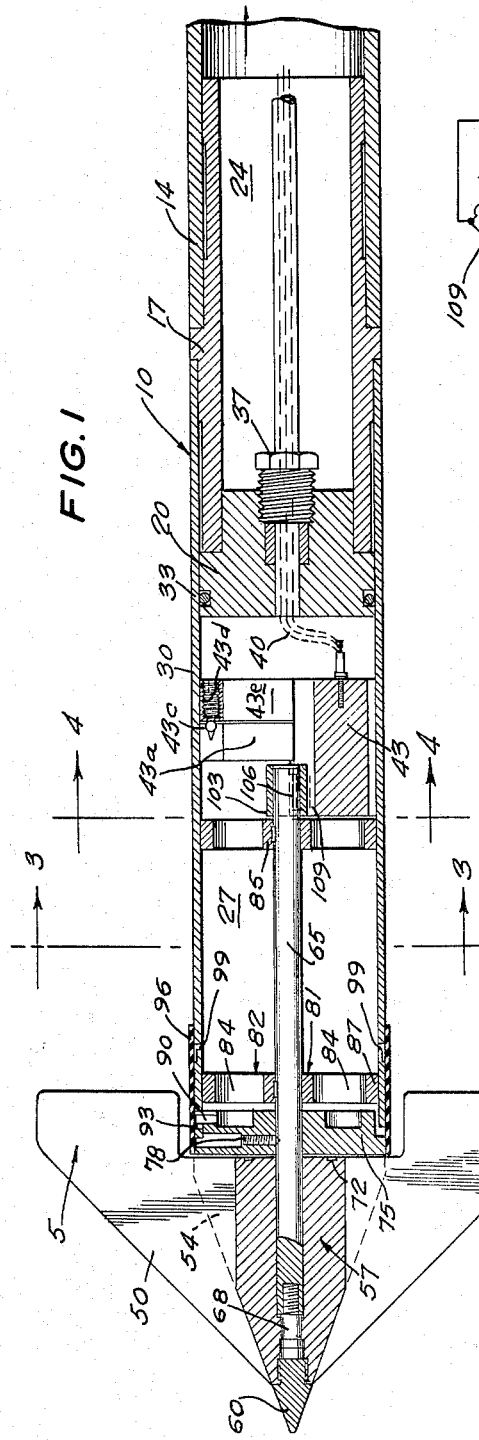
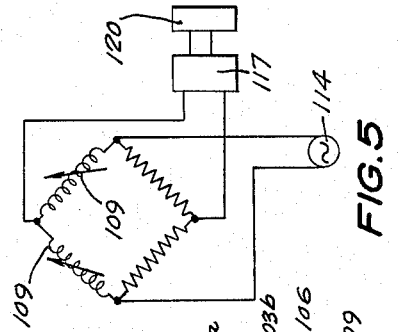
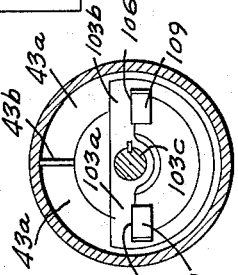
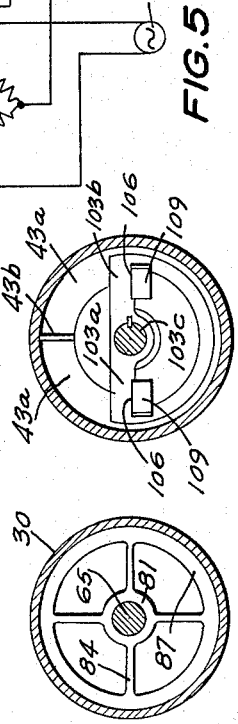
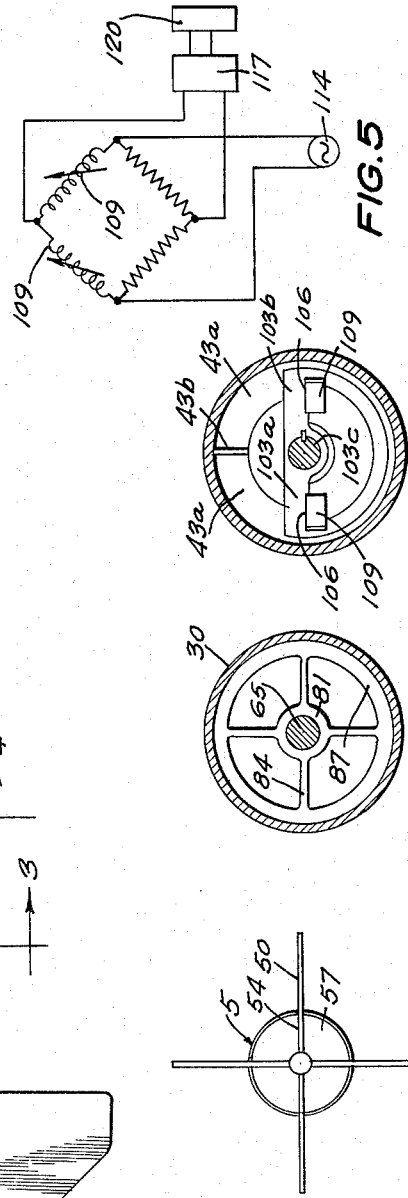
INVENTOR
JOHN V. ATANASOFF
BY
ATTORNEY

United States Patent Office 3,175,395
Patented Mar. 30, 1965

3,175,395
APPARATUS FOR SENSING AND MEASURING FLUID TURBULENCE
John V. Atanasoff, Frederick, Md., assignor to Aerojet-General Corporation, Azusa, Calif., a corporation of Ohio
Filed Nov. 15, 1960, Ser. No. 69,331
9 Claims. (Cl. 73—170)

This invention relates to apparatus for measuring water turbulence and more particularly to a sensing element extending from the hull of a vessel, in the direction of movement of the vessel.

The prior art contains various devices for measuring water turbulence, notably, water vane devices or single blade devices which act as air foils and measure flow normal to the blade whether rotary or lamellar. However, the former device has the drawback of being readily fouled by seaweed, debris, etc., and also gives inaccurate results when carried by a moving vessel due to the varying speed of the vessel. The latter device cannot discriminate between rotary and lamellar turbulence and is particularly subject to inaccuracies due to pitching, yawing, and vibration of the conveying vessel.

The present invention seeks to overcome the drawbacks hereinabove stated to the end that a turbulence measuring device may be utilized which is particularly suitable for tracking of submarines responsive to the turbulent wake created by the passage of such underseas vessels.

It is an object of the present invention to provide a sensing element on which a rotatory force effected by water in turbulent condition will cause a rotational strain measureable by suitable electronic equipment, which latter equipment may be of a generally conventional nature.

It is another object of the invention to provide a sensing element which is insensitive to nonrotational forces so that it will measure only the vorticity of turbulence and will not be appreciably affected by lamellar flow such as might be caused by pitching and yawing of the vessel on which it is mounted.

It is a further object of the invention to provide a sensing element which will be rugged, simple to manufacture and assemble, of a form to minimize the chance of fouling by seaweed or other underwater debris, and so devised as to eliminate breakdown due to any extreme of turbulence encountered.

It is a still further object of the invention to provide a sensing meter responsive to tubulence within a wide range of forces encountered.

Other objects and features of the invention will be apparent from the detailed description to follow hereinafter.

In general, I construct the sensing element for a turbulence measuring apparatus in the form of an elongated body member, preferably tubular, one end of which is securely fastened to the prow of a vessel or submarine, etc., and the other end of which carries a bladed impeller element to which torque is transmitted by the forces of turbulence met as the vessel proceeds through the water. The purpose of the elongated tube, perhaps 10'–20' in length, is to maintain the sensing blade or impeller element well beyond the normal turbulence caused by the forward movement of the vessel itself, and normally the impeller is carried well below the water line so as not to be affected by the waves or the bow wave of the vessel or other surface disturbances. The impeller element experiences a torque force effected by turbulence and magnified by the forward velocity of the vessel, thereby causing a very slight rotary motion of the impeller. Such rotary motion is manifested in an electric current by a signal means actuated in response to rotary impeller motion, effecting a variation in an electric current which may be detected and recorded or measured as by a visual meter. The electrical circuitry, as hereinabove indicated, may be of general conventional nature insofar as detection amplification and meter measuring, etc. is concerned. However, a magnetic sensing device, consisting of armature elements in an electromagnetic field for varying the flux of the field to effect detectable changes in current, is believed to have certain novel features.

In normal operation the torque force on the impeller is essentially proportional to the angular velocity of the water surrounding it, wherein it is understood that the effective diameter of a water vortex is greater than the diameter of the impeller. For vortices of smaller diameter than the impeller, the torque effect on the impeller is reduced by the ratio of the vortex diameter to the impeller diameter. Inasmuch as the impeller is moving axially through the water, rotational movement of the water, that is, a vortex, effects a force at an angle to the blades of the impeller. Based on air foil theory, the torque effect on the blade will be $T=KWV$, where K is a constant involving blade dimensions and fluid dimensions, W is the angular velocity of the water, and V is the forward velocity of the impeller, i.e., of the vessel which carries the impeller. The construction and arrangement is such that angular deflection of the impeller is proportional to the torque force applied by the water turbulence striking it, and therefore, for any fixed forward velocity V the angular deflection of the impeller is proportional to the angular velocity W of the water.

A detailed description of the invention will now be given in conjunction with the appended drawing, in which:

FIG. 1 is a longitudinal cross section of the sensing element;
FIG. 2 is a front view of the impeller;
FIG. 3 is a section on the line 3—3 of FIG. 1;
FIG. 4 is a section on the line 4—4 of FIG. 1; and
FIG. 5 is a general schematic of the electrical circuitry involved.

Referring now to the drawing, and in particular to FIGS. 1 through 4, the invention comprises an impeller 5 supported at the outer extremity of an elongated supporting structure or tube 10, which tube is made up of several sections. Thus, the section 14, shown broken at its extreme right end, will be understood to be a tube or pipe of suitable length to be rigidly fastened to the prow of a forwardly moving vesssel at a horizontal distance to maintain impeller 5 far enough away so as not to be subject to turbulence created by the hull itself; and also deep enough below the water surface to avoid surface turbulence. Suitably and integrally secured to the section 14 is an inner section 17 which may be soldered, sweated, threaded, or otherwise fastened to section 14. The inner end of section 17 is closed by a shouldered plug 20 as shown, which plug will be understood to seal the chamber 24 at one side of the plug from the chamber 27 at the other side of the plug, which chamber 27 is within a forward section 30 of the tubular construction. The chamber 24 may either be empty or permitted to be open to sea water. The chamber 27, however, is filled with oil in order to balance the outside water pressure on the section 30 and particularly on certain supporting components of impeller 5, as will be later described. To further the sealing effect, an O-ring 33 may be utilized. The section 17 is suitably secured to the section 30 as by soldering, sweating, threading, or the like, while the plug 20 may be secured either to the section 30 or the section 17, or both. It will be understood that the plug and the several tubular sections thus far described may be permanently secured to each other or may be arranged for disassembly as with threaded joints or other equivalent means.

The plug 20 carries a suitable cable grommet 37 for conducting cables 40 from a magnetic type of pickup to be hereinafter described in detail, but which pickup comprises a circular aluminum frame 43 that supports certain components of the pickup system. Frame 43 is non-rotatively carried in section 30, having cylindrical arms 43a (FIG. 4) separated by a slot 43b which can be spread by a ball 43c pushed by a screw 43d. The screw 43d is carried in a circular section 43e of frame 43. Thus, frame 43 can be very securely locked in place by rotation of the screw effecting forcing apart of arms 43a to frictionally grip the internal wall of section 30.

Referring now to the impeller 5, it will be noted that it consists of four blades 50, carried in respective slots 54 of a nose or hub element 57. The blades are flat and face edgewise in the direction of motion; that is, they have no pitch. Any suitable mode of securement of the blades in the respective slots may be used. The outer end of hub 57 is closed by a pointed noseplug 60 which may be threaded into the hub. Hub 57 is carried on a shaft 65 being secured thereto by an axial screw 68, but it will be understood that the hub 57 is freely rotative on the shaft 65 and not keyed thereto.

The inner face of the hub 57 carries a frictional ring slip clutch 72 which bears against a face plate 75, the face plate 75 being keyed by a set screw 78 to shaft 65 which passes through the face plate. The shaft extends into the section 30 and is supported in a pair of spaced support rings or spiders of resilient material 82 and 85. Elements 82 and 85 are substantially identical. Thus, each of these support rings comprises a hub 81 and four radial, flexible webs such as 84 which extend to an outer ring 87 which is secured as by soldering, or the like, within the section 30. The webs or arms 84 thus effect a spider-like configuration and, due to their flexibility, it will be understood that an angular twist of impeller 5 acting through slip clutch 72, face plate 75, and shaft 65 can effect relative rotation or slight twist of hub 81. The amount of twist effected is of very small degree and well within the ability of the hub 81 to rotate with respect to rim 87 without causing any permanent distortion of webs 84 or other parts of the spiders 82, 85.

From the above description it will be apparent that any torque force exerted on impeller 5 by water turbulence will effect a rotary movement of shaft 65 against the resilient reaction of arms 84 of the spiders.

The combined rotational spring constant of spiders 82 and 85 may be about ten in. lbs. per 0.001 radian for practical purposes, although this, of course, may vary depending on the turbulent forces expected.

As hereinbefore stated, the impeller has free rotational motion on shaft 65, but imparts torque via frictional slip clutch ring 72 to face plate 75. This effects a safety feature to prevent breakage in the event of very heavy turbulent conditions met by the impeller. Thus, the impeller can rotate independently of shaft 65, which shaft is provided with means to limit the degree of its rotation, as by a pin 90 carried radially by face plate 75 and protruding into a slot 93, or oversized hole, provided at the outer margin of section 30. Assuming a hole to be used, it would be of the order of .135 in. in diameter whereas the pin would be of the order of .125 in diameter.

Thus, it will be seen that the limits of movement of the shaft 65 and face plate 75 keyed thereto would be quite small, being merely .010 in. at the rim of the face plate, for a face plate of, say 3″ in diameter.

In order to effectively seal the chamber 27, the impeller end thereof is closed by a boot or sleeve 96, of suitably flexible material such as rubber, plastic, neoprene, etc., which is sealingly cemented to the exterior of section 30 and also to the rim of face 75. However, boot 96 is of suitable length as to not materially add to the reaction force of the spiders 82 and 85. Thus, the impeller torque forces work essentially only against the resilience of the spider arms 84 and readily overcome any force necessary to effect twisting of the boot without hampering the proportional accuracy of the device.

Section 30 is provided with holes such as 99 to permit oil, or other suitable liquid, in chamber 27 to enter intermediate the exterior of the section and the interior of the boot 96. Such oil is under a suitable degree of pressure to keep out any sea water leakage into chamber 27 and, in fact may be provided with sufficient initial pressure to slightly bulge boot 96 in order to compensate for any possible air bubbles within the oil, and to compensate for possible oil leakage. When the instrument is immersed in water the external water pressure is transmitted to the oil through the boot so that there is essentially no pressure difference across the walls of the instrument or across the rubber boot. Also, since the oil is essentially non-compressible, there will be no motion of the boot as the external pressure changes.

Referring to FIG. 4 in particular, the inner end of shaft 65 is provided with an element of a signal means comprising armature 103 which may be of aluminum and which has two radially extending arms 103a and 103b, as shown, the shaft 65 passing through a bore 103c and being keyed in any suitable manner therein. Each radial arm of the armature carries a ferrite plate 106 disposed in the flux field of respective solenoids 109, which are carried in suitably provided sockets in the aluminum block 43. The gap between the ferrite plates and the respective solenoids is of the order of .010 in. and, thus, it will be apparent that any electromagnetic flux surrounding the solenoids will be considerably affected by rocking of armature 103 as effected by torque exerted on shaft 65.

Thus, referring to FIG. 5, showing the general schematic circuitry of the signal means, a reluctance bridge is disclosed which comprises the solenoids 109 to which an oscillatory current is fed as by any suitable oscillator 114 and any unbalance of the bridge as would be effected by rocking of armature 103 would be detected and amplified by the detector-amplifier 117, the output being fed to a meter or recorder or the like, 120, for observation. The principles of operation of the reluctance bridge of FIG. 5 are very well known and need not be explained in detail for purposes of understanding this invention.

Having thus described my invention, I am aware that various changes may be made without departing from the spirit thereof and, accordingly, I do not seek to be limited to the precise illustration herein given except as set forth in the appended claims.

I claim:

1. A turbulence meter comprising a support means, a reversibly rotative impeller carried thereby and having blades disposed to be freely and externally exposed in radial and axial directions to a surrounding fluid medium the turbulence of which is to be measured, signal means connected to said impeller operative to effect signals responsive to rotation of said impeller in either direction, and resilient means connected to said impeller operative to yieldingly resist rotation thereof in either direction, said support means carrying said impeller for movement in a predetermined path through said fluid medium whereby said impeller is subject from all sides to turbulent forces of said medium.

2. A turbulence meter as set forth in claim 1, said resilient means comprising a ringlike element carried by said support means and having a hub structure and an outer rim, said impeller being connected to said hub structure so as to effect twist thereof as said impeller experiences fluid turbulence, and resilient arm means intermediate said hub and said rim, said rim being secured to said support means.

3. A turbulence meter as set forth in claim 1, said support means comprising a casing, a rotative end plate for said casing coaxial with said impeller and secured thereto, a flexible sealing boot secured to said end plate and extending over an adjacent end of said casing, port means in said casing at said adjacent end for effecting communication of a pressure fluid within said casing to the interior of said boot whereby to prevent leakage of exterior fluid into said casing.

4. A turbulence meter as set forth in claim 1, said blades comprising a plurality of angularly spaced planar elements disposed in radial array with respect to the axis of said impeller and disposed in respective planes passing thru the impeller axis.

5. A turbulence meter as set forth in claim 1, said signal means comprising an armature rotative with said impeller and having a ferrite plate on each side of the rotative axis of said impeller, solenoids associated with said plates whereby movement of said armature takes place relative to said solenoids, and means operatively connected to said solenoids for integrating said signals to give a measurable indication of turbulence.

6. A turbulence meter as set forth in claim 1, including a slip clutch intermediate said impeller and said signal means and disposed to transmit torque from said impeller to said resilient means.

7. A turbulence meter comprising a casing, a reversibly rotative impeller carried by said casing at an end thereof and exteriorly thereof for exposure to a fluid thru which said impeller is moved in an axial direction, signal means within said casing and a torque transmitting shaft between said impeller and said signals means, spaced resilient members connected to said shaft and operative to yieldingly resist rotation thereof in either rotational direction, said members being spaced within said casing and supporting said shaft.

8. A turbulence meter as set forth in claim 7, said resilient members each comprising a ringlike element having a hub structure and an outer rim, said shaft being connected to said hub structures so as to effect twist thereof as said impeller experiences fluid turbulence, and each member having resilient arm means intermediate its hub and its rim capable of flexing as said shaft rotates in either direction and effecting substantially equal resistance to rotation of said shaft in either rotational direction.

9. A turbulence meter comprising a support means, a reversibly rotative impeller carried thereby and disposed so as to be freely exposed in a surrounding fluid medium the turbulence of which is to be measured, signal means connected to said impeller operative to effect signals responsive to rotation of said impeller in either direction, and resilient means connected to said impeller operative to yieldingly resist rotation thereof in either direction, said resilient means comprising a ringlike element carried by said support means and having a hub structure and an outer rim, said impeller being connected to said hub structure so as to effect twist thereof as said impeller experiences fluid turbulence, and resilient arm means intermediate said hub and said rim, said rim being secured to said support means, said support means comprising a substantially sealed casing and said resilient means being therein, a rotative end plate for said casing coaxial with said impeller and secured thereto, a flexible sealing boot secured to said end plate and extending over an adjacent end of said casing, port means in said casing at said adjacent end for effecting communication of a pressure fluid within said casing to the interior of said boot whereby to prevent leakage of exterior fluid into said casing.

References Cited by the Examiner
UNITED STATES PATENTS

| | | | |
|---|---|---|---|
| 575,455 | 1/97 | Berger | 73—229 |
| 1,421,405 | 7/22 | Chernikeeff | 73—185 |
| 2,800,794 | 6/53 | Meneghelli | 73—228 |
| 2,714,310 | 8/55 | Jennings | 73—194 |
| 2,826,064 | 3/58 | Hastings | 73—136 |
| 2,948,887 | 8/60 | Mounteer et al. | 73—386 X |

RICHARD C. QUEISSER, *Primary Examiner.*

ROBERT L. EVANS, DAVID SCHONBERG,
*Examiners.*